2,917,488

VACUUM DEHYDRATION OF THE RESIDUE FROM THE FURFURAL EXTRACTION OF BUTADIENE

Mortimer T. Harvey, South Orange, and Peter L. Rosamilia, Newark, N.J., assignors to Harvel Research Corporation, a corporation of New Jersey No Drawing. Application August 3, 1954
Serial No. 447,678

2 Claims. (Cl. 260—67)

This invention relates to novel compositions of matter and to methods for preparing them. In one of its more specific aspects the invention is directed to novel methods for treating the residues formed in the furfural extractive distillation method for the purification of butadiene-1,3 and to the novel products produced thereby.

It has been well known in the art that in the extractive distillation of $C_4$ hydrocarbon mixtures containing butadiene in which furfural is employed as the selective solvent, there are formed certain by-products generally known in the art as residues formed in the furfural extractive distillation method for the purification of butadiene. Such residues vary in consistency from dark practically solid, semi-solid, to fairly fluid light colored liquid masses. Said residues have a melting point (ball and ring) no greater than 80° F. These residues (Hillyer et al., Ind. and Eng. Chem., vol. 40, November 1948, pp. 2216–2220), are also treated in our co-pending companion application, Serial No. 435,622, filed June 9, 1954, of which this application is a continuation-in-part.

For a long time said residues were not found useful commercially and were long regarded and treated as useless waste products presenting a disposal problem. In commercial practice, as known to us, such residues or by-products were disposed of by burning in some instances. We have discovered that said residues may be treated to provide novel and highly useful products finding use in a number of different arts.

According to this invention said residues are maintained at elevated temperatures in the range of about 220° F. to 375° F. under vacuum of 5–125 mm. of mercury pressure for a sufficient period of time that when they are subsequently cooled to room temperature they will be a thermoplastic solid having a softening point (ball and ring) of approximately 130° F. to 240° F. It is preferred to accomplish this in two stages. First the raw residue is heated between 220°–290° F. at atmospheric pressure to dehydrate and then under such reduced pressure and temperature of 300° F.-375° F. the mass is maintained to obtain the desired product.

Said novel thermoplastic solids are superior to the untreated residues in that dehydration and polymerization having taken place, some of the volatile components have been removed to change the character thereof to provide more useful products and to provide products which may be more readily handled in commerce and use. By eliminating the more volatile constituents the novel thermoplastic solids when combined with other materials, provide stocks which remain uniform for long periods of time.

The following are specific examples of the novel methods for treating such raw residues and the novel products obtained thereby. Said examples are given by way of illustration and are not to be taken in a limiting sense, all parts being given by weight unless otherwise specified.

Example 1

Into an oven maintained at 260°-280° F. was placed a steel drum containing 485 lbs. of water-laden raw residue obtained as a by-product in the purification of butadiene in which the furfural extractive distillation method was employed. Some of the water was in a separate upper layer and was ladled out. A sample of said residue was tested for softening point (ball and ring) which was found to be about 40° F. The drum containing the mass was maintained at 260°-280° F. therein at that temperature for about 17 hours whereupon said residue was substantially completely dehydrated and some of the higher volatiles originally contained therein had been removed. The resultant mass weighed 412 pounds and was a dark, thick fluid mass. The entire resultant mass, while under a 25"–29" vacuum, was heated to about 325° F. and was maintained under such reduced pressure conditions and at said temperature, while being constantly stirred, for a period of about 10 hours and then was poured into shallow pans and allowed to cool to room temperature whereupon it was converted to a thermoplastic solid having a softening point (ball and ring) of 165° F. weighing 350 pounds, and is hereinafter known as product I.

Example 2

4725 lbs. of a water-laden raw residue, obtained as a by-product in the purification of butadiene in which the furfural extractive distillation method was employed, was heated and maintained at aproximately 270° F. for dehydration and then its temperature was elevated to 315° F. while under 26"–28" vacuum and maintained under those conditions while being stirred until a sample cooled to room temperature had a softening point (ball and ring) of 170° F. The mass was poured into shallow pans and cooled to room temperature and became a solid thermoplastic mass having such softening point and is hereinafter known as product II. The amount of water removed in said heat treatment amounted to about 452 lbs. and the amount of organic distillate collected was about 319 lbs. The amount of product II was 3954 lbs.

Example 3

5372 pounds of the raw residue obtained as a by-product in the purification of butadiene in which the furfural extractive distillation method was employed, was, while being constantly stirred, heated slowly to 320° F.–325° F. while under 26"–28" vacuum, and was maintained under such conditions until a sample cooled to room temperature solidified and had a softening point (ball and ring) of approximately 160° F. The mass was poured into shallow pans and cooled to room temperature and at such temperature is a solid weighing about 4850 lbs. and having a softening point (ball and ring) of about 160° F. and is hereinafter known as product III.

The novel products of this invention, examples of which are products I, II and III, may be polymerized under alkaline conditions of pH of 8.0–12 while maintained at a temperature of 250°–350° F. to convert them to substantially infusible products which may be comminuted and used in such form as friction augmenting discrete particle components in clutch facings or brake linings. The novel products may also be combined with one or a combination of two or more rubbery materials such as natural rubber, rubbery homopolymers of butadiene, rubbery copolymers of butadiene and styrene and rubbery copolymers of butadiene and acrylonitrile to improve their ozone resistance and ageing qualities and find utility as cable coverings, electrical insulation, coated fabrics, etc. In general, the ratio of the novel products or combination of two or more of them employed with the rubbery material varies depending upon the type of stock desired, but may be 3–200 parts of the former to 100 parts of the latter, all parts by weight. They also may be combined with normally solid polyvinyl chloride, polyvinyl acetate, copolymers of vinyl chloride and vinyl acetate to provide novel and highly useful products finding use in the fields of electrical insulation and coatings generally.

This application is a continuation in part of our applications Serial Nos. 211,576 filed February 17, 1951, and now abandoned; 238,376 filed July 24, 1951, and now abandoned; 338,876 filed February 25, 1953, and issued on December 10, 1957, as U.S. Patent No. 2,816,286; 360,827 filed June 10, 1953, and issued on December 10, 1957, as U.S. Patent No. 2,816,086; 435,621 filed June 9, 1954, and issued on December 17, 1957, as U.S. Patent No. 2,816,878; 435,622 filed June 9, 1954, and issued on November 25, 1958, as U.S. Patent 2,861,978; and 441,656 filed July 6, 1954, and issued on December 17, 1957 as U.S. Patent No. 2,816,979.

Having thus described our invention, what we claim is:

1. The method comprising at elevated temperature in the range of approximately 220° F. to approximately 375° F. and under subatmospheric pressure in the range of 5 to 125 mm. of mercury pressure, maintaining a residue having a softening point (ball and ring) no greater than 80° F. and obtained as a by-product in the purification of butadiene in which the furfural extractive distillation method was employed, until the resultant mass when cooled to 70° F. is a thermoplastic solid having a softening point (ball and ring) in the range of approximately 130° F.–240° F.

2. The method comprising dehydrating at about 220° F.–290° F. a residue having a softening point (ball and ring) no greater than 80° F. and obtained as a by-product in the purification of butadiene in which the furfural extractive distillation method was employed, then maintaining said dehydrated residue in the temperature range of 300° F.–375° F. while under 5 mm.–125 mm. of mercury pressure until the resultant mass when cooled to 70° F. is a thermoplastic solid having a softening point (ball and ring) in the range of about 130° F.–240° F.

References Cited in the file of this patent

UNITED STATES PATENTS

| | | |
|---|---|---|
| 2,483,903 | Herbolshimer | Oct. 4, 1949 |
| 2,683,151 | Hillyer et al. | July 6, 1954 |
| 2,785,148 | Hilyer et al. | Mar. 12, 1957 |

OTHER REFERENCES

Hillyer et al.: Ind. and Eng. Chem., vol. 40, No. 11, November 1948, pages 2216–2220.